United States Patent [19]

Frame et al.

[11] 4,415,781

[45] Nov. 15, 1983

[54] MEMBRANE SWITCH

[75] Inventors: Norman J. Frame, Whitefish Bay; James P. Walber, Cedar Grove; Jan M. Janick, Brookfield, all of Wis.

[73] Assignee: W. H. Brady Co., Milwaukee, Wis.

[21] Appl. No.: 323,290

[22] Filed: Nov. 20, 1981

[51] Int. Cl.³ ........................ H01H 13/70; G06F 3/02

[52] U.S. Cl. ................................ 200/5 A; 200/52 R; 200/DIG. 1; 178/17 C; 179/90 K; 340/365 C; 340/365 S; 340/365 A; 340/365 R; 361/416

[58] Field of Search ................ 361/416, 322; 338/307, 338/308; 200/5 A, 5 R, 159 B, DIG. 1; 340/365 R, 365 S, 365 A, 365 C; 178/17 C; 179/90 K

[56] References Cited

U.S. PATENT DOCUMENTS

| | | | |
|---|---|---|---|
| T904,008 | 11/1972 | Crouse | 178/17 C |
| 3,308,253 | 3/1967 | Krakinowski | 200/5 A |
| 3,337,426 | 8/1967 | Celto | 338/307 |
| 3,560,256 | 2/1971 | Abrams | 361/416 X |
| 3,676,616 | 7/1972 | Wiedmer | 200/5 R |
| 3,750,113 | 7/1973 | Cencel | 340/365 C |
| 3,778,816 | 12/1973 | Cuccio | 340/365 S |
| 4,015,254 | 3/1977 | Strandt | 340/365 R |
| 4,034,176 | 7/1977 | Larson | 200/5 A X |
| 4,038,167 | 7/1977 | Young | 361/322 X |
| 4,158,115 | 6/1979 | Parkinson et al. | 200/5 A |
| 4,373,122 | 2/1983 | Frame | 200/159 B |

*Primary Examiner*—J. R. Scott

[57] ABSTRACT

A membrane switch in which switch activation produces a change in the combined resistance and capacitance across leads of the switch.

10 Claims, 4 Drawing Figures

MEMBRANE SWITCH

CROSS-REFERENCES TO RELATED APPLICATIONS

This application is related to co-pending application Ser. No. 323,281, filed Nov. 20, 1981 and application Ser. No. 407,450, filed Aug. 12, 1982.

BACKGROUND OF THE INVENTION

This invention relates to capacitance-type switches, in which switch activation produces a change in capacitance, which change is sensed by external circuitry. For example, depression of a movable key may act to increase the capacitance across switch leads. The invention also relates to membrane switches, in which typically a flexible layer supporting a contact is depressed (e.g., by touching its upper surface) to produce switch activation.

SUMMARY OF THE INVENTION

We have discovered an improved membrane switch in which switch activation produces a change in the combined resistance and capacitance across leads of the switch.

In preferred embodiments, a capacitor is connected to one contact of the membrane switch and a resistor to the other contact; the resistor and capacitor are of the thin-film type and deposited on layers of the membrane switch (e.g., the capacitor deposited on the substrate and the resistor on the membrane); the capacitor is a sandwich of a dielectric layer between conductive layers; the resistor is a layer of resistive material spanning a gap between transversely spaced conductive layers; the capacitor and resistor are located at locations transversely remote from the switch contacts (e.g., to retain switch transparency when the membrane and contacts are transparent but the resistor and capacitor are opaque); and preferred materials are used.

PREFERRED EMBODIMENT

I turn now to a description of the presently preferred embodiment of the invention, after first briefly describing the drawings.

DRAWINGS

DESCRIPTION

Figure 1:
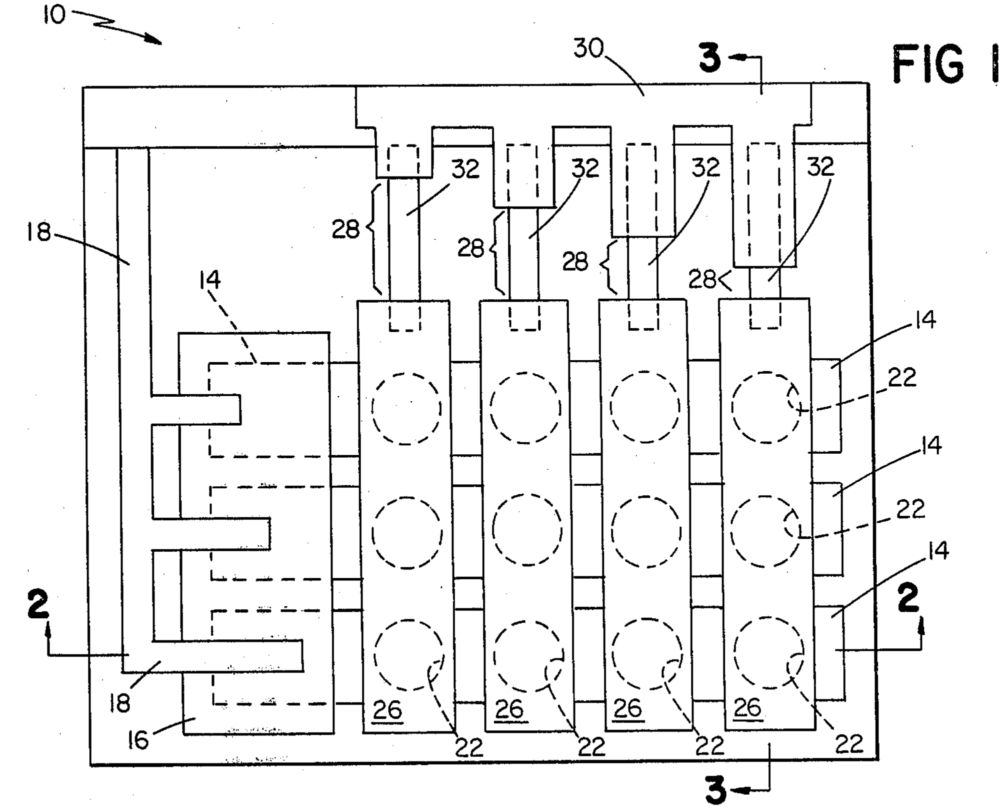
FIG. 1 is a plan view of said preferred embodiment.
Figure 2:
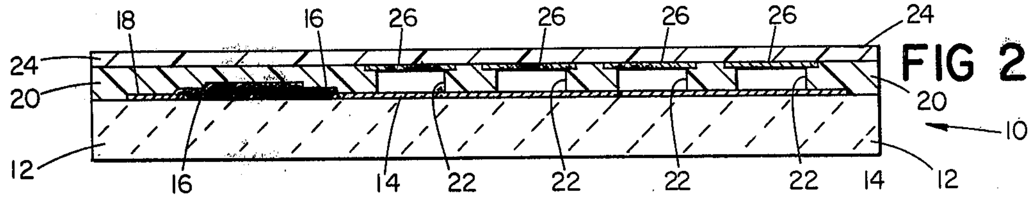
FIG. 2 is an enlarged cross-sectional view taken at 2—2 of FIG. 1, with the thickness of various layers greatly exaggerated and not to scale.
Figure 3:
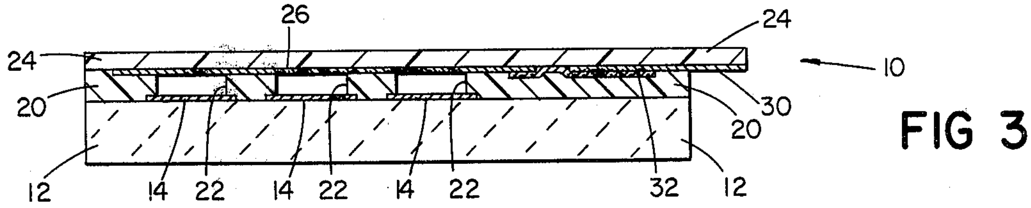
FIG. 3 is an enlarged cross-sectional view taken at 3—3 of FIG. 1, with the thickness of various layers greatly exaggerated and not to scale.
Figure 4:
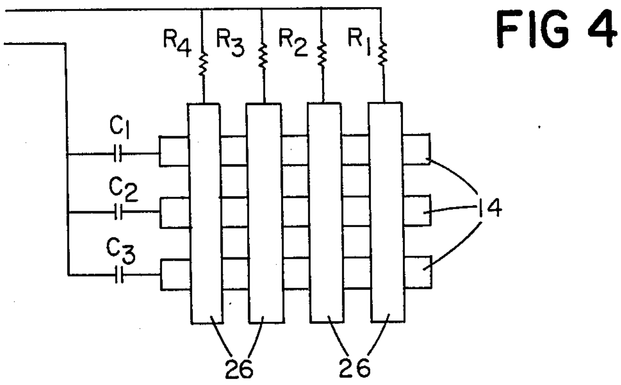
FIG. 4 is a schematic diagram of the electrical elements of said embodiment.

Turning now to the drawings, there is shown a membrane switch 10 (i.e., a switch in which a flexible layer is flexed in order to produce a signal output). Glass substrate 12 (FIG. 2) has vacuum deposited on its upper surface, through a suitable mask, three horizontal row conductors 14 (2000 Angstrom thick aluminum). At the left edge of the glass substrate there are formed three thin-film capacitors $C_1$–$C_3$ of different capacitance values. Pad 16 of $Ta_2O_5$ dielectric is vacuum deposited over the left ends of row conductors 14. The pad is, in turn, covered by a vacuum deposited layer 18 of aluminum, which extends (FIG. 1) from the pad along the left edge of the switch to the upper edge where a connection can be made to external circuitry. The areas of aluminum overlapping the $Ta_2O_5$ and row conductors are each a different size to provide the three different capacitance values $C_1$–$C_3$ (2, 12, and 60 nanofarads).

On top of glass substrate 12 is a top layer 24 of 5-mil thick transparent polyester film on which has been vacuum deposited, through a suitable mask, four column conductors 26 (4000 Angstrom thick copper). At the upper edge of the switch, there are formed four thin-film resistances $R_1$–$R_4$. Varying size gaps 28 between column conductors 26 and edge contact 30 (also 4000 thick copper) are filled with pads 32 of vacuum deposited nichrome resistive material, thereby providing the desired four resistance values $R_1$–$R_4$ (1K, 2K, 3K, and 4K ohms). Edge contact 30 provides the second connection to external circuitry.

Over the column conductors and other vacuum deposited layers on top layer 24 there is deposited, through a mask, spacer layer 20 ($\frac{1}{2}$-mil thick pressure-sensitive acrylic adhesive), which has generally circular openings 22 aligned with the twelve switch locations defined by the areas where row conductors 14 cross column conductors 26. Switch 10 is finally assembled by applying top layer 24 with its adhesive spacer layer 20 to glass substrate 12.

In operation, a selected switch is activated by depression of top layer 24 at the desired switch location. That action causes a column conductor 26 on the undersurface of layer 24 to engage a row conductor 14 through an opening 22 in the spacer layer. External detection circuitry then senses the value of the RC combination produced and generates a signal identifying the switch location.

OTHER EMBODIMENTS

Other embodiments of the invention are within the following claims. For example, in situations where the number of desired switch locations demands an excessively large number of different capacitance values (such as would place excessive demands of manufacturing tolerances in laying down the capacitors), it is possible to organize the switch array into subarrays. Each subarray employs all of the available capacitance values, each row conductor of the subarray being connected to a different capacitance. All the capacitors of one subarray are connected to the detection circuitry by a common lead, and there is a separate such lead for each subarray. The same arrangement can be provided for the resistors, but as a greater number of resistance values can generally be provided than capacitance values, it may often be possible to provide a different resistance value for each column conductor. For a 48 by 48 matrix of switches, such an embodiment might have 6 subarrays, each with the same eight different capacitance values, and 48 different resistance values, bringing to seven the number of leads required for the switch. For the case of a matrix for a CRT screen having a 512 by 256 pixel array, which translates to 131,072 individual locations, this subarray arrangement would require only about 48 separate leads.

What is claimed is:

1. A switch assembly comprising a flexible membrane supporting a first contact, a spacer layer positioned below said membrane for spacing it from a facing surface having a second contact aligned with said first contact, a capacitor and resistor electrically connected to said first and second contacts in series, and first and second electrical leads for connecting said contacts and said capacitor and resistor to external circuitry, whereby switch activation can be sensed by external circuitry connected to said leads by sensing a unique resistance and capacitance combination across said leads.

2. The switch assembly of claim 1 wherein one electrical connection of said capacitor is connected to one of said first and second contacts, one electrical connection of said resistor is connected to the other of said first and second contacts, said first electrical lead is connected to the other of said capacitor connections, and said second electrical lead is connected to the other of said resistor connections.

3. The switch assembly of claim 1 wherein said resistor and capacitor are of the thin-film type and one of said resistor and capacitor is deposited on said membrane.

4. The switch assembly of claim 3 further comprising a substrate incorporating said facing surface and second contact and wherein one of said capacitor and resistor is deposited on said substrate.

5. The switch assembly of claim 4 wherein said capacitor comprises a layer of dielectric material deposited over a first layer of conductive material and covered by a second layer of conductive material, all three said layers being deposited on either said membrane or substrate.

6. The switch assembly of claim 5 wherein said resistor comprises a layer of resistive material spanning across a gap between transversely spaced apart third and fourth layers of conductive material, all three of said layers being deposited on either said membrane or substrate.

7. The switch assembly of claim 6 wherein said capacitor and resistor are located on said membrane and substrate at regions transversely remote from said first and second contacts and there are provided first and second conductors connecting said capacitor and resistor with said contacts.

8. The switch assembly of claim 7 wherein said contacts, conductors, layers of conductive material, dielectric material, and resistive material are vacuum deposited onto said membrane and substrate.

9. The switch assembly of claim 8 wherein said capacitor is deposited on said substrate and said resistor on said membrane.

10. The switch assembly of claim 9 wherein said substrate is glass, said membrane is polyester, said spacer layer is pressure-sensitive acrylic adhesive deposited on said membrane prior to assembly of said membrane onto said glass, said first contact and conductor is Al deposited on said glass, said second contact and conductor is copper deposited on said polyester, said dielectric is $Ta_2O_5$, and said resistive material is nichrome.

* * * * *